(12) United States Patent
Shirahige

(10) Patent No.: US 10,031,751 B2
(45) Date of Patent: Jul. 24, 2018

(54) ARITHMETIC PROCESSING DEVICE AND METHOD FOR CONTROLLING ARITHMETIC PROCESSING DEVICE

(71) Applicant: FUJITSU LIMITED, Kawasaki-shi, Kanagawa (JP)

(72) Inventor: Yuji Shirahige, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 198 days.

(21) Appl. No.: 15/056,495

(22) Filed: Feb. 29, 2016

(65) Prior Publication Data

US 2016/0283230 A1    Sep. 29, 2016

(30) Foreign Application Priority Data

Mar. 27, 2015    (JP) ................. 2015-065892

(51) Int. Cl.
    *G06F 9/30*        (2018.01)
    *G06F 12/0875*    (2016.01)

(52) U.S. Cl.
    CPC ........ *G06F 9/3001* (2013.01); *G06F 12/0875* (2013.01); *G06F 2212/452* (2013.01)

(58) Field of Classification Search
    None
    See application file for complete search history.

(56) References Cited

U.S. PATENT DOCUMENTS

| | | | |
|---|---|---|---|
| 8,037,250 B1 * | 10/2011 | Barreh | ................ G06F 12/0842 711/125 |
| 2009/0210660 A1 | 8/2009 | Webber | |
| 2010/0095071 A1 | 4/2010 | Shirahige | |

FOREIGN PATENT DOCUMENTS

| | | |
|---|---|---|
| JP | 2011-511378 A | 4/2011 |
| WO | 2008155826 A1 | 12/2008 |

* cited by examiner

*Primary Examiner* — John Lindlof
(74) *Attorney, Agent, or Firm* — Fujitsu Patent Center

(57) ABSTRACT

A processing device includes an instruction control unit outputting an instruction fetch request; a primary cache having a request port for the instruction fetch request and a cache processing unit that outputs instruction data for the instruction fetch request; and a secondary cache returning the instruction data to the primary cache. The request port has a primary port provided in common to threads and storing information on the instruction fetch requests of the threads, secondary ports provided for each threads, and each storing entry numbers of the primary port, and a request determination unit determining, from among the entered instruction fetch requests, an instruction fetch request to be input to the primary cache, with priority on an instruction fetch request waiting for being input to the primary cache, in an order of the instruction fetch requests of the respective threads that are output from the instruction control unit.

13 Claims, 13 Drawing Sheets

FIG. 10

| | C | R0 | R1 | R2 | R3 | N_TH |
|---|---|---|---|---|---|---|
| T20 | 0 | 0 | 0 | 0 | 0 | - |
| | | 1 | 0 | 0 | 0 | 0 |
| | | * | 0 | 0 | 1 | 3 |
| | | * | 0 | 1 | * | 2 |
| | | * | 1 | * | * | 1 |
| T21 | 1 | 0 | 0 | 0 | 0 | - |
| | | 0 | 1 | 0 | 0 | 1 |
| | | 1 | * | 0 | 0 | 0 |
| | | * | * | 0 | 1 | 3 |
| | | * | * | 1 | * | 2 |
| T22 | 2 | 0 | 0 | 0 | 0 | - |
| | | 0 | 0 | 1 | 0 | 2 |
| | | 0 | 1 | * | 0 | 1 |
| | | 1 | * | * | 0 | 0 |
| | | * | * | * | 1 | 3 |
| T23 | 3 | 0 | 0 | 0 | 0 | - |
| | | 0 | 0 | 0 | 1 | 3 |
| | | 0 | 0 | 1 | * | 2 |
| | | 0 | 1 | * | * | 1 |
| | | 1 | * | * | * | 0 |

ARITHMETIC PROCESSING DEVICE AND METHOD FOR CONTROLLING ARITHMETIC PROCESSING DEVICE

CROSS-REFERENCE TO RELATED APPLICATION

This application is based upon and claims the benefit of priority of the prior Japanese Patent Application No. 2015-065892, filed on Mar. 27, 2015, the entire contents of which are incorporated herein by reference.

FIELD

The present invention relates to an arithmetic processing device and a method for controlling the arithmetic processing device.

BACKGROUND

Multi-threading of arithmetic processing devices (i.e., processors or central processing units (CPUs)), in which each of the processors executes a plurality of threads, is proceeding. The multi-threading needs the efficient processing of cache memories (hereinafter, simply abbreviated as "caches"). In particular, instruction caches are needed to efficiently process the instruction fetch requests of respective threads when reading the respective instructions of the plurality of threads from memories.

For example, an instruction cache needs to process instruction fetches based on the order of instruction fetch requests inside threads but is allowed to the process instruction fetches regardless of the order of the instruction fetch requests between the threads.

When a plurality of instruction caches are provided corresponding to the multi-threading, the respective instruction caches are allowed to process the instruction fetch requests of respective threads in the same way as single threads. In addition, it has been proposed that one instruction cache control unit is shared between a plurality of threads and that a request port used to retain instruction fetch requests output from an instruction control unit and a wait port used to manage instruction fetch requests aborted due to their cache errors are provided for each of the plurality of threads.

A configuration in which an instruction cache is provided corresponding to the multi-threading is described in the Patent Literatures, International Publication Pamphlet No. WO2008/155826 and Japanese National Publication of International Patent Application No. 2011-511378.

SUMMARY

However, there is a likelihood that the number of simultaneously-executable threads will increase in the future. Therefore, if the numbers of request ports and abort management ports are increased with an increase in the number of threads, the sizes of circuits become greater. Accordingly, there is a demand for the reduction of circuit sizes even if the number of threads increases.

According to an aspect of the present disclosure, an arithmetic processing device includes: an instruction control unit that outputs an instruction fetch request; a primary cache that has a request port that enters the instruction fetch request output from the instruction control unit and a cache processing unit that outputs instruction data corresponding to the instruction fetch request in response to an input of the instruction fetch request; and a secondary cache that returns the instruction data to the primary cache in response to a data request output from the primary cache when a cache error is caused in the primary cache. And the request port has a primary port that is provided in common to a plurality of threads and stores information on the instruction fetch requests of the respective threads, a plurality of secondary ports that are provided corresponding to the plurality of threads, respectively, and each of which stores entry numbers of the primary port, and a request determination unit that determines, from among the entered instruction fetch requests input in the request port, an instruction fetch request to be input to the primary cache, by placing priority on an instruction fetch request waiting for being input to the primary cache, in an order in which the instruction fetch requests of the respective threads are output from the instruction control unit as for the instruction fetch requests of the respective threads.

A first aspect provides an arithmetic processing device that is compatible with multi-threading and reduces a circuit size and a method for controlling the arithmetic processing device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a diagram exemplifying the truth tables of the next thread determination circuit 31 in the second embodiment.

DESCRIPTION OF EMBODIMENTS

First Embodiment

Figure 1:
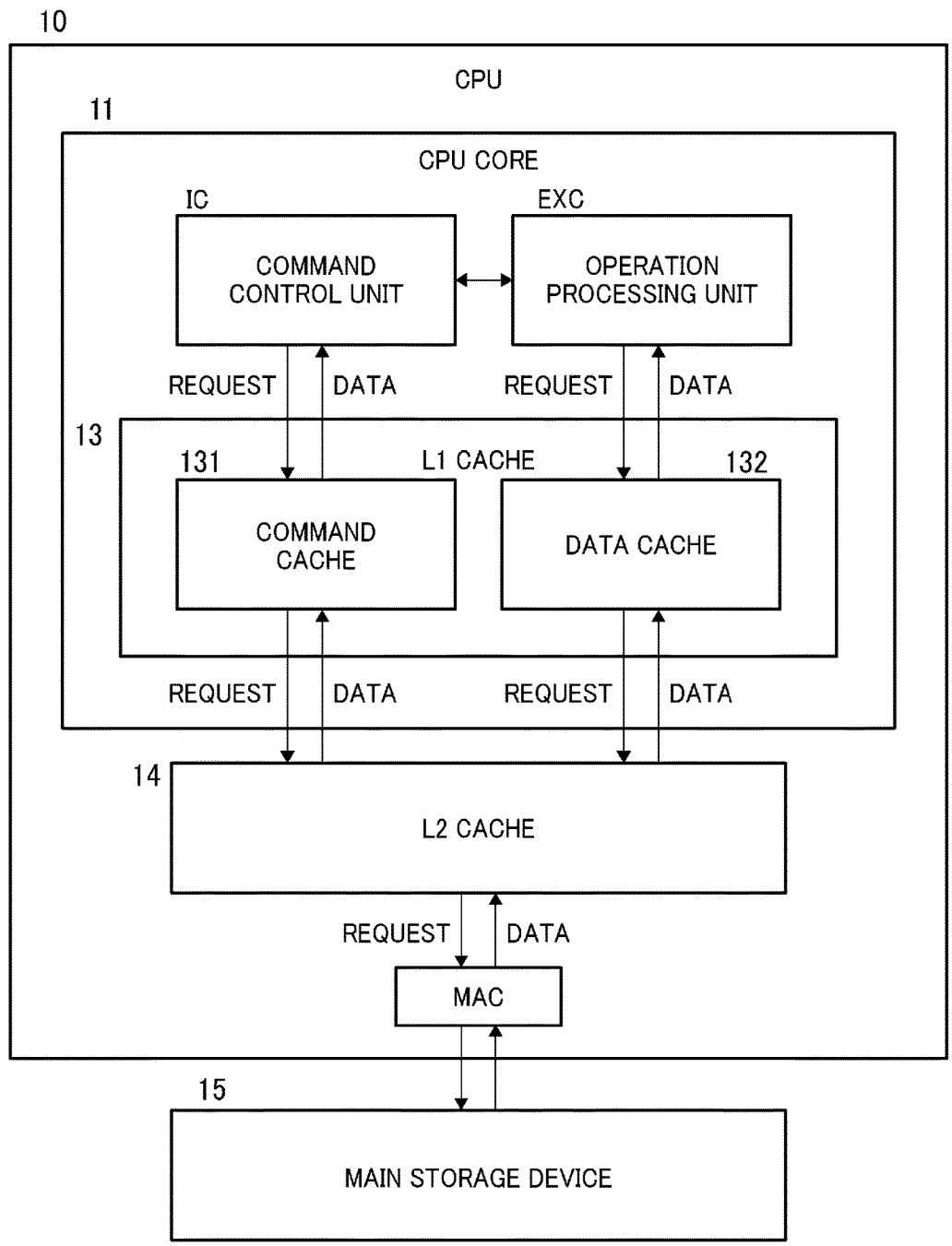
FIG. 1 is a diagram illustrating the configuration of an arithmetic processing device (i.e., a processor or a CPU) in an embodiment.

FIG. 1 is a diagram illustrating the configuration of an arithmetic processing device (i.e., a processor or a CPU) in an embodiment. A CPU 10 is connected to an external main storage device (main memory) 15. The CPU 10 has a CPU core 11 and a memory access controller MAC that controls access to the main memory 15. In addition, the CPU core 11 has an instruction control unit IC that generates an instruction fetch request to fetch an instruction and decodes an instruction to generate an operation request and has an arithmetic processing unit EXC that performs arithmetic processing based on an operation request.

In addition, the CPU core 11 has an L1 cache 13 as a primary cache, and the L1 cache 13 has an instruction cache 131 that stores an instruction as data and a data cache 132 that stores data. The CPU 10 has a single or a plurality of CPU cores 11.

Further, the CPU 10 has an L2 cache 14 as a secondary cache. In general, the L2 cache 14 is shared between a plurality of CPU cores 11.

The instruction control unit IC generates an instruction fetch request to fetch an instruction and outputs the generated instruction fetch request to the instruction cache 131 inside the L1 cache 13. The instruction fetch request is input to a cache processing circuit (not illustrated) having a pipeline inside the instruction cache 131, and the cache processing circuit reads instruction data in the L1 cache 13 and returns the read instruction data to the instruction control unit. When the instruction fetch request causes a cache error, the cache processing circuit outputs the instruction fetch request to the L2 cache 14 and inputs instruction data in the L2 cache 14 or the main memory 15 to the instruction cache 131 of the L1 cache 13.

On the other hand, the arithmetic processing unit EXC executes an operation request output from the instruction control unit IC, outputs a data access request to the data cache 132 inside the L1 cache 13 when necessary, and receives data in the L1 cache from the data cache 132 or data inside the L2 cache or the main memory 15.

In general, the instruction control unit IC issues instruction fetch requests in the order of instruction rows and receives instruction data in the same order as the instruction rows from the instruction cache 131. Accordingly, when an instruction fetch request causes a cache error, the instruction cache 131 aborts all instruction fetch requests input to the cache processing circuit after the instruction fetch request causing the cache error, receives instruction data on the instruction fetch request from the L2 cache 14, and inputs the aborted instruction fetch requests to the cache processing circuit again to continue the processing.

Meanwhile, in recent multi-thread systems, instruction fetch requests are needed to be processed in the order of instruction rows in respective threads but are not needed to be processed in the order of instruction rows between threads.

Figure 2:
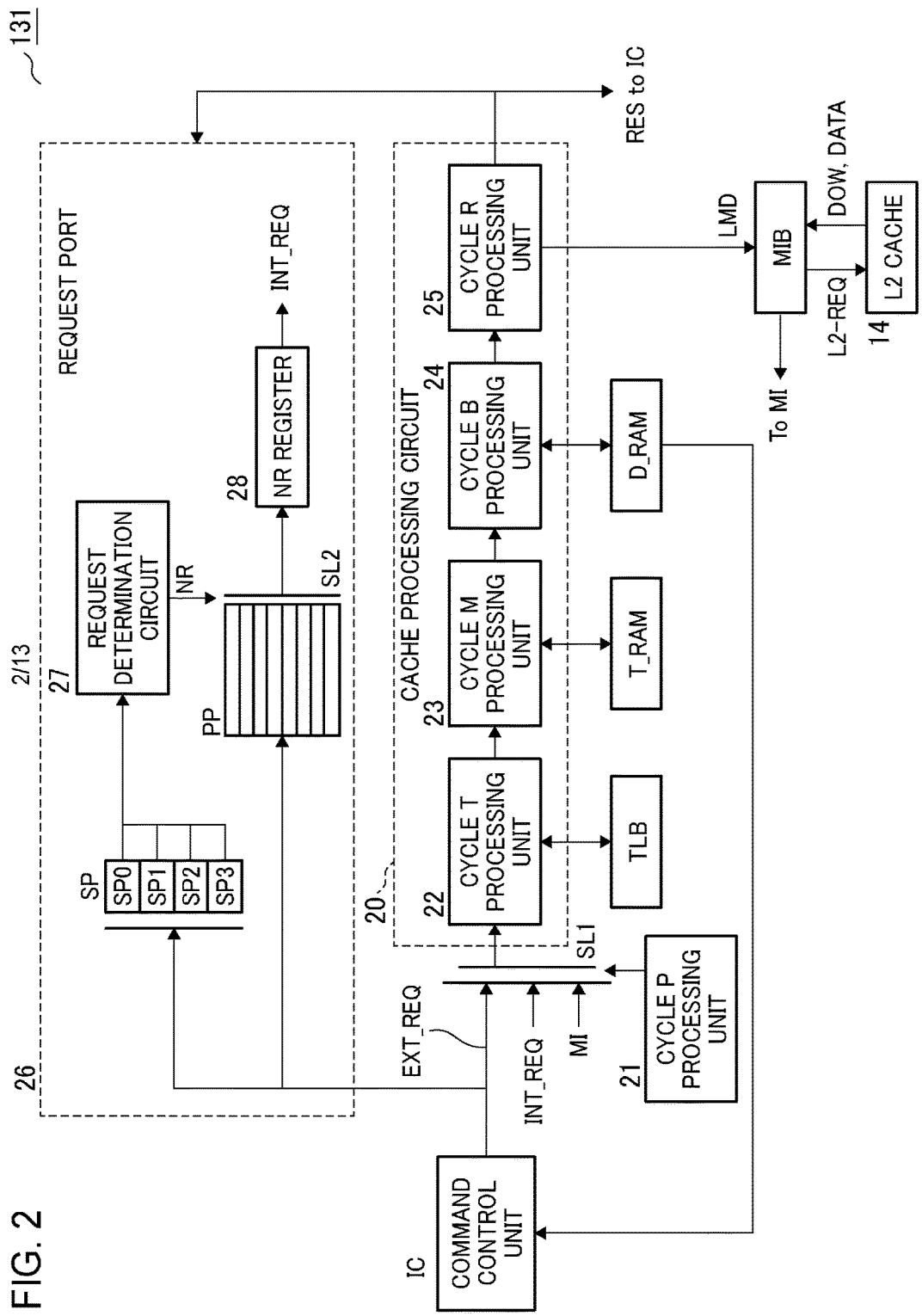
FIG. 2 is a diagram illustrating the configuration of the instruction cache 131 in the embodiment.

FIG. 2 is a diagram illustrating the configuration of the instruction cache 131 in the present embodiment. FIG. 2 illustrates the configuration of the instruction cache 131 inside the L1 cache, the instruction control unit IC, and the L2 cache 14. The instruction cache 131 of FIG. 2 illustrates an example in which four threads are capable of being simultaneously executed. That is, the CPU core 11 is capable of simultaneously executing four threads at a maximum. Therefore, the instruction control unit IC generates instruction fetch requests of instruction rows in four threads at a maximum and loads (inputs) the generated instruction fetch requests to the instruction cache 131.

The instruction cache 131 has a request port 26 that accepts an instruction fetch request output from the instruction control unit IC, a cache processing circuit 20 that outputs instruction data corresponding to the instruction fetch request in response to the input instruction fetch request, a translation lookaside buffer TLB, a tag memory T_RAM, a data memory TD_RAM, and a move-in buffer MIB. The cache processing circuit 20 is a processing circuit having a plurality of processing units in a pipeline configuration.

The request port 26 accepts an entered instruction fetch request generated and input to the instruction cache 131 by the instruction control unit IC. When instruction data is returned to the instruction control unit IC in response to the input instruction fetch request, the request port 26 invalidates the entered instruction fetch request. The entered instruction fetch request generated by the instruction control unit IC is accepted by the primary port PP and the secondary ports SP of the request port 26 via a control circuit not illustrated.

The request port 26 has the primary port PP provided in common to a plurality of (four) threads and the plurality of secondary ports provided corresponding to the plurality of threads, respectively. The primary port PP stores information on the instruction fetch requests of respective threads, e.g., addresses. The secondary ports SP (SP0, SP1, SP2, and SP3) store entry numbers inside the primary port PP that stores information on the instruction fetch requests of corresponding threads. The number of the secondary ports SP0, SP1, SP2, and SP3 equals the number of threads capable of being simultaneously processed, i.e., four.

In addition, the request port 26 has a request determination circuit 27 that selects an instruction fetch request to be next input to the cache processing circuit 20. The request determination circuit 27 places priority on an instruction fetch request waiting for being input to the cache processing circuit 20 among entered instruction fetch requests accepted by the request port 26 and determines, as for the instruction fetch requests of respective threads, an instruction fetch request to be input to the cache processing circuit 20 in the order in which the instruction fetch requests are output from the instruction control unit IC.

Specifically, the request determination circuit 27 determines an instruction fetch request generated in the earliest time among instruction fetch requests waiting for being input to the cache processing circuit 20 of the L1 cache inside the respective secondary ports SP0, SP1, SP2, and SP3 and determines an instruction fetch request to be next input in a prescribed order among the instruction fetch requests of respective threads selected from the respective secondary ports. FIG. 2 illustrates a selector SL2 that selects one of a plurality of entries of the primary port PP. The selector SL2 selects one of a plurality of entries of the primary port PP based on a next request signal NR indicating an instruction fetch request determined to be next input and stores the address of the selected entry in a next request register 28.

The instruction cache 131 has a selector SL1 that selects a request to be input. The selector SL1 selects, based on a signal selected by a cycle P processing unit 21, one of an external request input EXT_REQ to which an instruction fetch request generated by the instruction control unit IC is input, an internal request input INT_REQ to which an instruction fetch request output from the request port 26 as a next request is input, and a move-in input MI to which a move-in serving as a request for registering instruction data acquired from the L2 cache in the L1 cache is input. The cycle P processing unit 21 is one of the processing circuits in the pipeline configuration of the cache processing circuit 20 that will be described later.

The cache processing circuit 20 has the above cycle P (Priority) processing unit 21, a cycle T (TLB) processing unit 22, a cycle M (Match) processing unit 23, a cycle B (Buffer) processing unit 24, and a cycle R (Result) processing unit 25, which form the pipeline configuration.

The cycle P processing unit 21 selects one of the three inputs EXT_REQ, INT_REQ, and MI with the selector SL1 based on prescribed priority and inputs the selected input to the cache processing circuit 20. The cycle T processing unit 22 refers to the TLB and converts the virtual address of an input instruction fetch request into the physical address of the main memory. The cycle M processing unit 23 performs matching as to whether the physical address of the tag memory T_RAM searched with the virtual address matches the physical address converted with the TLB. By the matching, determination is made as to whether the instruction fetch request causes a cache hit or a cache error. Then, when the instruction fetch request causes the cache hit, the cycle B processing unit 24 buffers instruction data read from the data memory D_RAM. Moreover, the cycle R processing unit 25 outputs a processing result RES of the instruction fetch request. The instruction data read from the data memory D_RAM is returned to the instruction control unit IC. The above processing will be described in detail later.

When an input instruction fetch request causes a cache error inside the cache processing circuit 20, the instruction cache 131 aborts the instruction fetch request causing the cache error and a subsequently-input instruction fetch request of the same thread and puts the aborted instruction fetch requests inside the request port 26 into a waiting state.

In addition, the instruction cache 131 has the move-in buffer MIB that outputs the instruction fetch request to the L2 cache 14 when the input instruction fetch request causes the cache error inside the cache processing circuit 20. When accepting the instruction data from the L2 cache, the move-in buffer MIB inputs the cache registration request of the instruction data to the cache processing circuit 20 via the move-in input MI. Then, in succession to the cache registration request, the instruction fetch request in the waiting state to be output from the request port 26 is input to the cache processing unit 20 via the input INT_REQ. In response to the input, the cache processing unit 20 returns instruction data causing a cache hit and read from the data memory DRAM to the instruction control unit IC.

When the instruction fetch request in the waiting state is input to the cache processing unit 20, an instruction fetch request inside the request port 26 is put into a non-waiting state. Then, when the cache processing circuit 20 returns instruction data on the input instruction fetch request to the instruction control unit IC, the instruction fetch request inside the request port 26 is put into an invalid state.

Figure 3:
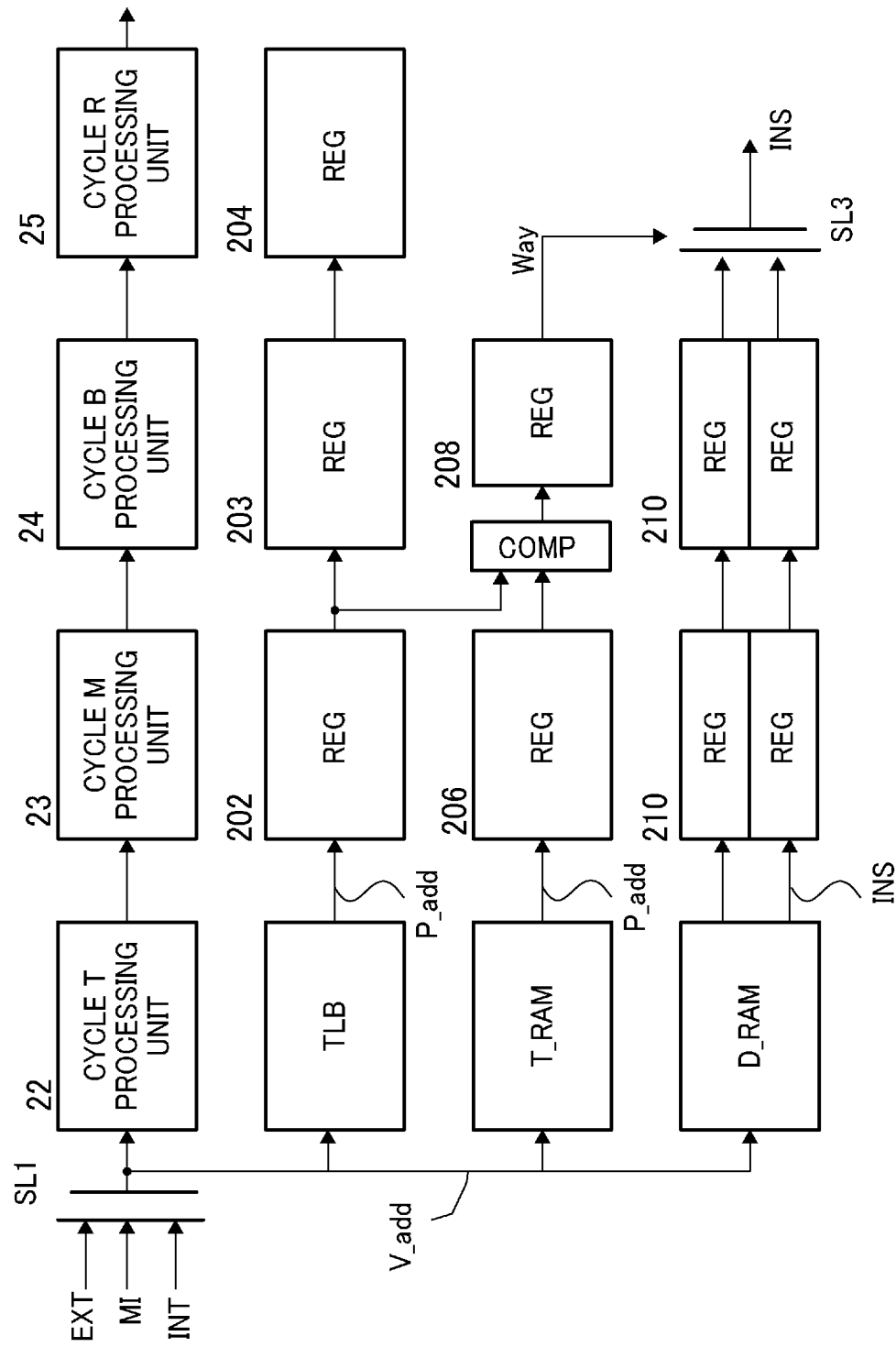
FIG. 3 is a diagram illustrating the processing of the cache processing circuit 20 in detail.

FIG. 3 is a diagram illustrating the processing of the cache processing circuit 20 in detail. In the configuration of FIG. 3, it is illustrated that the processing is executed in the order of cycles T, M, B, and R. An instruction fetch request input via the input ports EXT and INT includes the virtual address V_add of a fetch destination.

First, in the cycle T processing unit 22, the TLB converts the virtual address V_add into a physical address P_add that is stored in a register 202, and the tag memory T_RAM and the data memory D_RAM are searched based on the virtual address V_add.

Both the tag memory T_RAM and the data memory D_RAM are constituted by a plurality of ways. The tag memory T_RAM stores the physical address of cache-registered data corresponding to the virtual address. Then, the tag memory T_RAM outputs a physical address P_add corresponding to the virtual address V_add of an instruction fetch request to a register 202 via the plurality of ways.

The data memory D_RAM stores cache-registered instruction data corresponding to the virtual address V_add. The data memory D_RAM outputs to a register 210 instruction data INS corresponding to the virtual address V_add of the instruction fetch request via the plurality of ways.

Next, in the cycle M processing unit 23, a comparator COMP compares the physical addresses P_add of the register 202 and a register 206 with each other and when the physical addresses P_add match each other, outputs matched way information Way to a register 208. It is determined that a cache hit is caused when the physical addresses P_add match each other and a cache error is caused when the physical addresses P_add do not mach each other.

Then, in the cycle B processing unit 24, a selector SL3 selects one of the instruction data output from the plurality of ways based on the way information Way inside the register 208.

Figure 4:
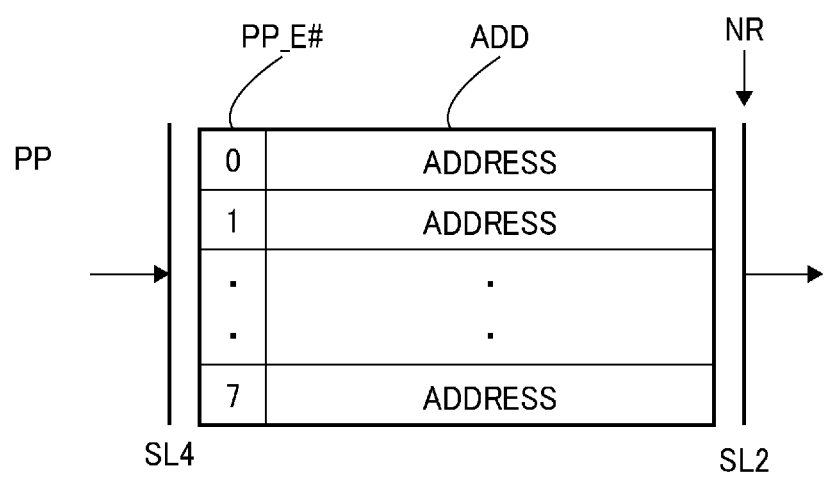
FIG. 4 is a diagram illustrating the configuration of the primary port.

FIG. 4 is a diagram illustrating the configuration of the primary port. The primary port PP is a register provided in common to a plurality of threads. The primary port PP has the registers of a plurality of entries and stores the addresses ADD of entered instruction fetch requests accepted by the request port 26 in the registers of respective entries PP_E#. An input selector SL4 stores the address ADD of an entered instruction fetch request newly accepted by the request port 26 in an invalid (vacant) one of the plurality of entries PP_E#. In addition, the output selector SL2 selects, as described above, one of the entries inside the primary port PP based on the entry information NR of an instruction fetch request that is determined by the request determination circuit 27 to be next input, and then outputs the address ADD of the selected entry.

The number of the entries of the primary port may be set at any number but is preferably smaller than the total number of the entries of the secondary ports. This is because the primary port stores the addresses ADD of instruction fetch requests and thus a greater number of entries results in an increase in a circuit size.

Figure 5:
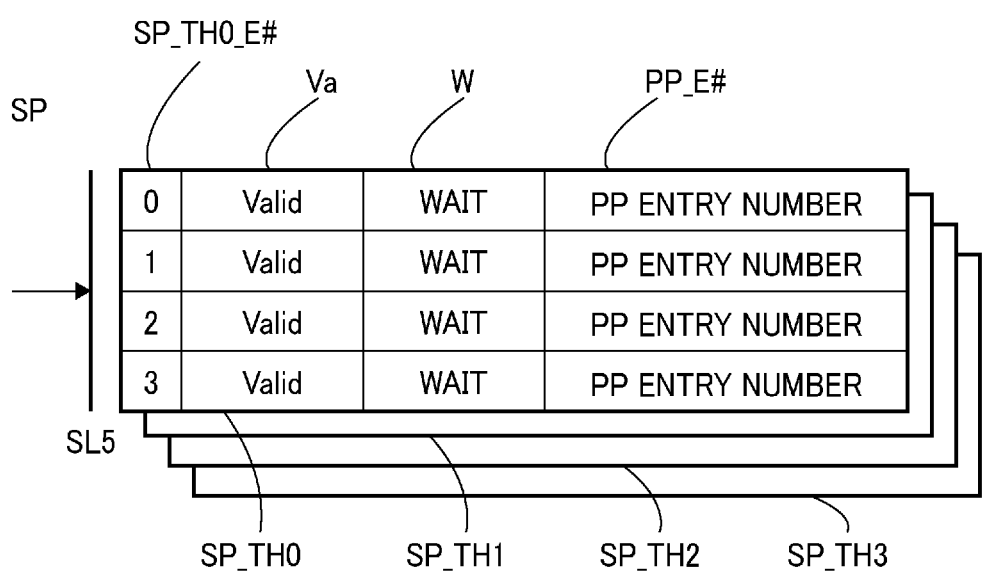
FIG. 5 is a diagram illustrating the configuration of the secondary ports.

FIG. 5 is a diagram illustrating the configuration of the secondary ports. The secondary ports SP are registers provided corresponding to a plurality of threads, respectively. In the secondary ports SP, when four threads are capable of being simultaneously processed at maximum, secondary ports SP_TH0, SP_TH1, SP_TH2, and SP_TH3 are provided corresponding to four threads TH0 to TH3. The respective secondary ports SP_TH# have the registers of a plurality of entries. In an example illustrated in FIG. 5, the respective secondary ports SP_TH# have the registers of four entries. The number of the entries of the secondary ports may be set at any plural number but is preferably greater than the number of pipelines inside the cache processing circuit 20.

For respective entry numbers SP_TH0_E#, the secondary port SP_TH0 stores entry numbers PP_E# inside the primary port PP, in which information on instruction fetch requests accepted by the request port 26, e.g., addresses are stored, and stores wait bits W and valid bits Va corresponding to the entry numbers PP_E#.

The valid bit Va is a flag indicating whether information inside the entry is valid or invalid. The valid bit Va is put into a valid state "1" when an instruction fetch request is accepted by the request port 26 and put into an invalid state "0" when the instruction fetch request is normally processed by the cache processing circuit 20 and instruction data is returned to the instruction control unit IC.

The wait bit W is put into a waiting state "1" when a corresponding instruction fetch request is aborted due to a cache error in the cache processing circuit 20 and put into a non-waiting state "0" when the instruction fetch request is input to the cache processing circuit 20. In addition, when an entered instruction fetch request generated by the instruction control unit IC is accepted by the request port 26 rather than being input to the cache processing circuit 20 via the external request input EXT_REQ, the wait bit W is put into the waiting state "1."

Moreover, inside the secondary port SP_TH0, older instruction fetch requests are stored in the entries of smaller entry numbers by an input selector SL5. Accordingly, information on the oldest instruction fetch request is stored in the entry of the entry number SP_TH0_0 at any time, and information items on instruction fetch requests are stored in the entries of the entry numbers SP_TH0_1 to SP_TH0_3 in chronological order.

The secondary ports are provided corresponding to a plurality of threads, respectively. However, since the respective entries of the secondary ports store only the valid bits Va, the wait bits W, and the entry numbers of the primary port, the capacity of data stored in the secondary ports is small. Accordingly, the plurality of secondary ports provided corresponding to the respective threads does not result in an increase in the circuit size.

Figure 6:
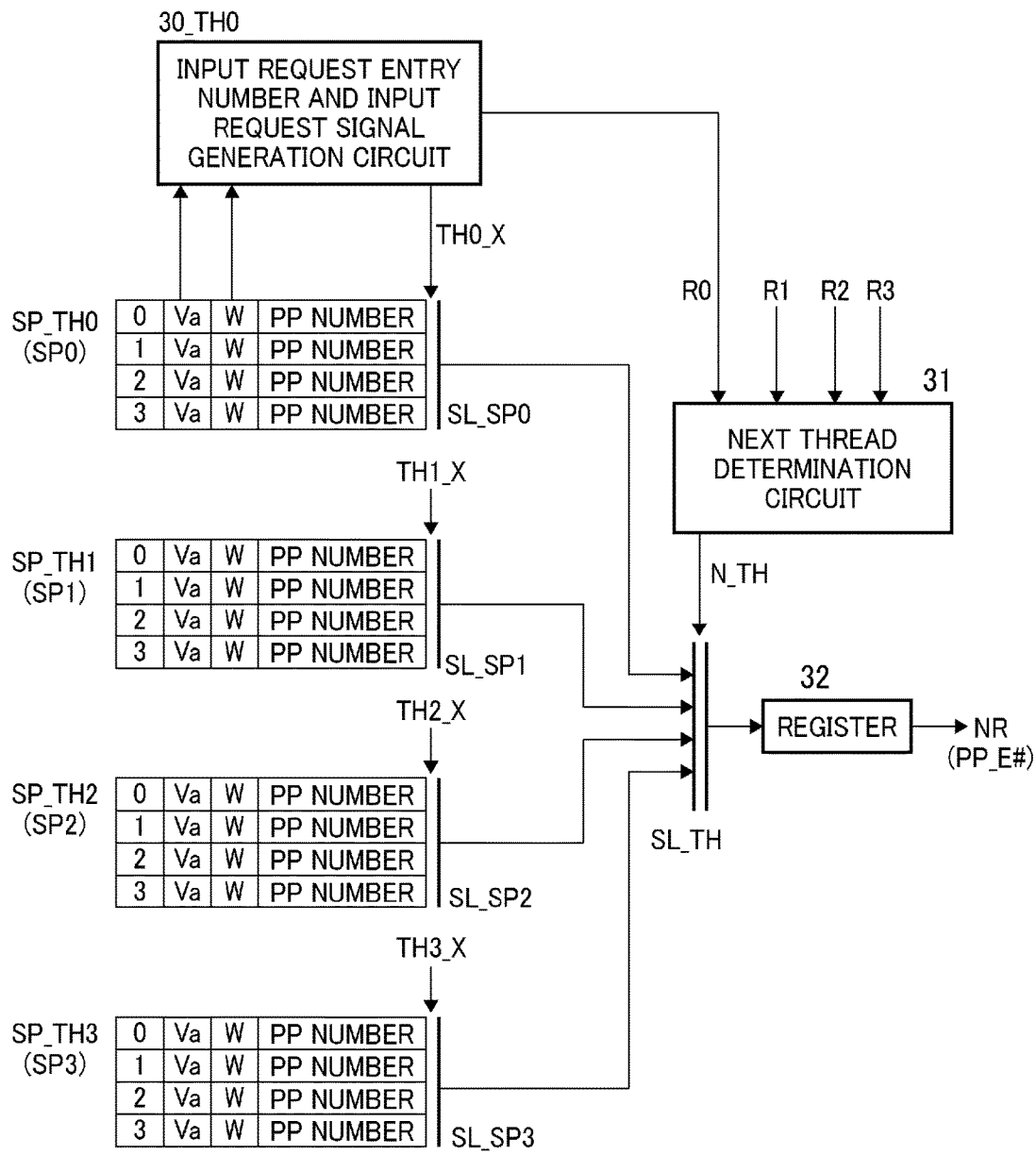
FIG. 6 is a diagram illustrating the configuration of the request determination circuit 27 inside the request port 26 of FIG. 2.

FIG. 6 is a diagram illustrating the configuration of the request determination circuit 27 inside the request port 26 of FIG. 2. The request determination circuit 27 has input request entry number and input request signal generation circuits 30 that accept the valid bits Va and the wait bits W of the secondary ports SP and output input request entry numbers TH#_X and input request signals R# and has a next thread determination circuit 31 that determines a thread N_TH to be next input in a prescribed order among four threads.

The input request entry number and input request signal generation circuits 30 are provided corresponding to the respective secondary ports. However, FIG. 6 illustrates only the generation circuit 30_TH0 corresponding to the secondary port SP_TH0 of the thread TH0 and does not illustrate the generation circuits 30 corresponding to the secondary ports of the other threads TH1 to TH3.

Note that "request" in the input request entry numbers TH#_X and the input request signals R# represents requesting for the input of an instruction fetch request to the cache processing circuit 20. On the other hand, "request" in instruction fetch requests represents requesting the instruction cache to perform instruction fetch processing.

The generation circuits 30 output the oldest entry numbers as the input request entry numbers TH#_X among the entry numbers of the secondary ports in which the valid bits Va are in the valid state "1" and the wait bits W are in the waiting state "1." That is, the generation circuits 30 select the smallest entry numbers in which both the valid bits Va and the wait bits W are in the valid state "1" and the "waiting state 1," respectively. Then, output selectors SL_SP# of the respective secondary ports select the PP entry numbers of the entries specified by the input request entry numbers TH#_X.

Thus, in the respective threads, the oldest entries in the waiting state are selected as the entries of instruction fetch requests to be input to the cache processing circuit 20. Accordingly, in the respective threads, the instruction fetch requests are input or input again to the instruction cache in the order of instruction rows inside the threads.

In addition, the generation circuits 30 set the input request signals R# at "1" when entries, in which the valid bits Va are in the valid state "1" and the wait bits W are in the waiting state "1," exist inside the secondary ports and set the input request signals R# at "0" when the entries do not exist. The input request signals R# (R0 to R3) are input to the next thread determination circuit 31.

The next thread determination circuit 31 determines one of the threads, in which the input request signals R0 to R3 are set at "1," as a next thread N_TH in a prescribed order. Then, the thread selector SL_TH outputs the PP entry number PP_E# of the determined thread to a register 32 based on the next thread N_TH determined by the next thread determination circuit 31. Thus, among the plurality of threads, instruction fetch requests in a waiting state are selected in a prescribed order. The prescribed order will be described in detail later.

Figure 7:
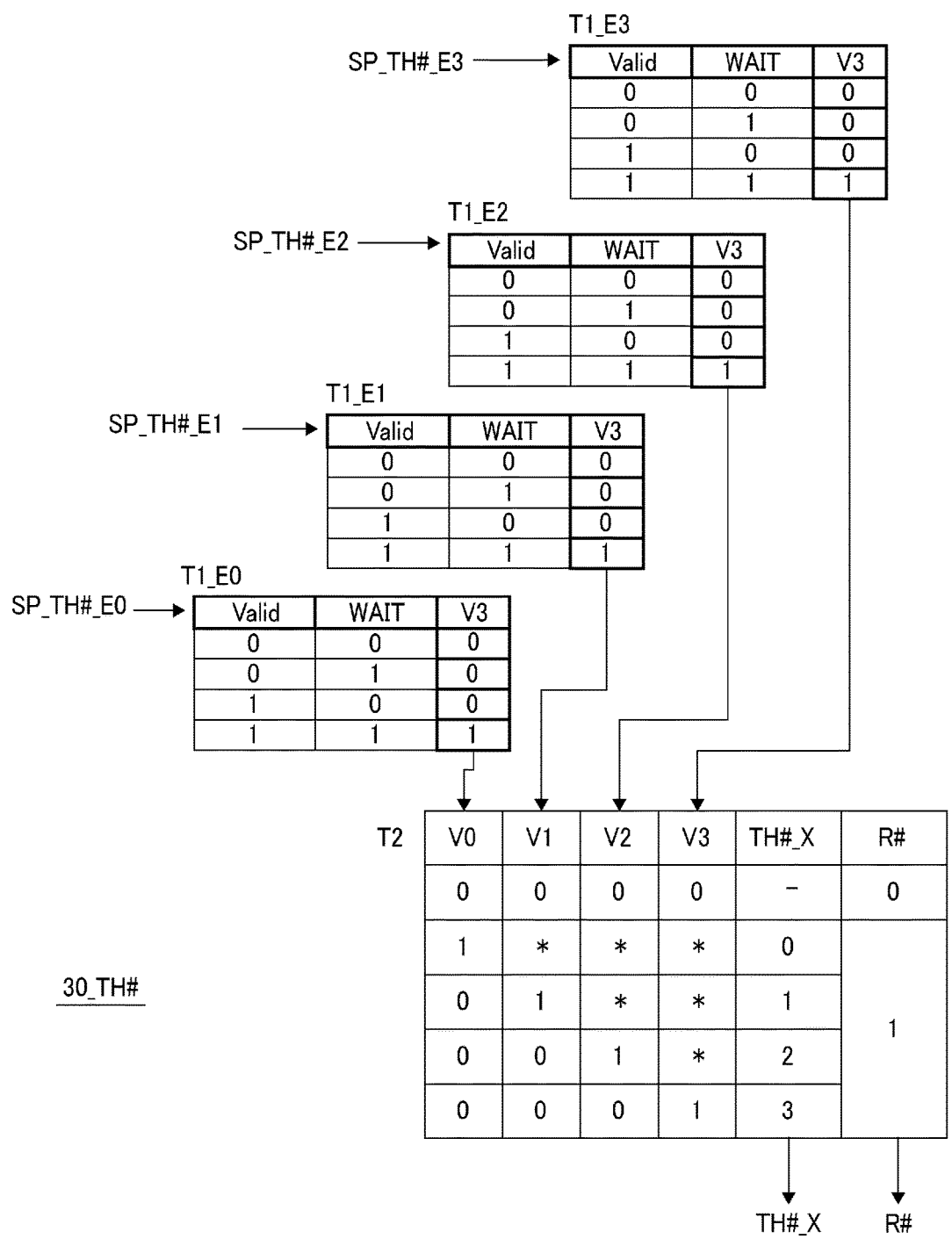
FIG. 7 is a diagram illustrating the truth tables of the input request entry number and input request signal generation circuit 30.

FIG. 7 is a diagram illustrating the truth tables of the input request entry number and input request signal generation circuit 30. As described above, the four generation circuits 30_TH0, 30_TH1, 30_TH2, and 30_TH3 are provided corresponding to the four threads TH0 to TH3. FIG. 7 illustrates one of the generation circuits 30_TH#.

The logical operation circuit of the generation circuit 30_TH# has first truth tables T1_E0, T1_E1, T1_E2, and T1_E3. The first truth tables T1_E0, T1_E1, T1_E2, and T1_E3 generate the input request flags V0, V1, V2, and V3 of the instruction fetch requests of the respective entries based on the valid bits Va and the wait bits W of the respective entries SP_TH#_E0, SP_TH#_E1, SP_TH#_E2, and SP_TH#_E3 of the secondary ports SP_TH#. Thus, in the entries in which the valid bits Va are in the valid state "1" and the wait bits W are in the waiting state "1," the input request flags V0, V1, V2, and V3 of the instruction fetch requests are put into an input requesting state "1."

In addition, the logical operation circuit of the generation circuit 30_TH# has a second truth table T2. Marks "*" inside the second truth table T2 represent "don't care." The second truth table T2 outputs the smallest entry number, i.e., the oldest entry number, as the entry number TH#_X of the entry whose instruction fetch request is requested to be input, among the entries in which the input request flags V0, V1, V2, and V3 of the instruction fetch requests are set at "1." In addition, the second truth table T2 outputs, when any one of the input request flags V0, V1, V2, and V3 is put into the input requesting state "1," the input request signal R# representing that corresponding one of the threads # makes an input request. The input request signal R# is merely the logical sum of the input request flags V0, V1, V2, and V3.

In the second truth table T2, when the input request flag V0 of the oldest entry is put into the input requesting state "1," the oldest entry number "0" becomes the entry number TH#_X of the entry whose instruction fetch request is requested to be input, regardless of the input request flags V1 to V3 of the other entries. Conversely, when the input request flag V3 of the newest entry is put into the input requesting state "1," the newest entry number "3" becomes the entry number TH#_X of the entry whose instruction fetch request is requested to be input, provided that all the input request flags V0, V1, and V2 of the entries older than the newest entry are put into an non-input requesting state "0."

As described above, the next thread determination circuit 31 inside the request determination circuit 27 determines a next thread from among the threads, in which the corresponding input request signals R1 to R3 are put into the input requesting state "1,". As a specific example of the prescribed order, a least recent use (LRU) method in which the oldest thread is selected, a round robin method in which the plurality of threads are set in a fixed circulating order and a recently-selected thread is set to be the newest thread in an circulating order to select the oldest thread, a most frequently-used (MFU) method in which a thread whose input request signal is most highly likely to be put into the input requesting state "1" is selected, or the like is applicable.

Figure 8:
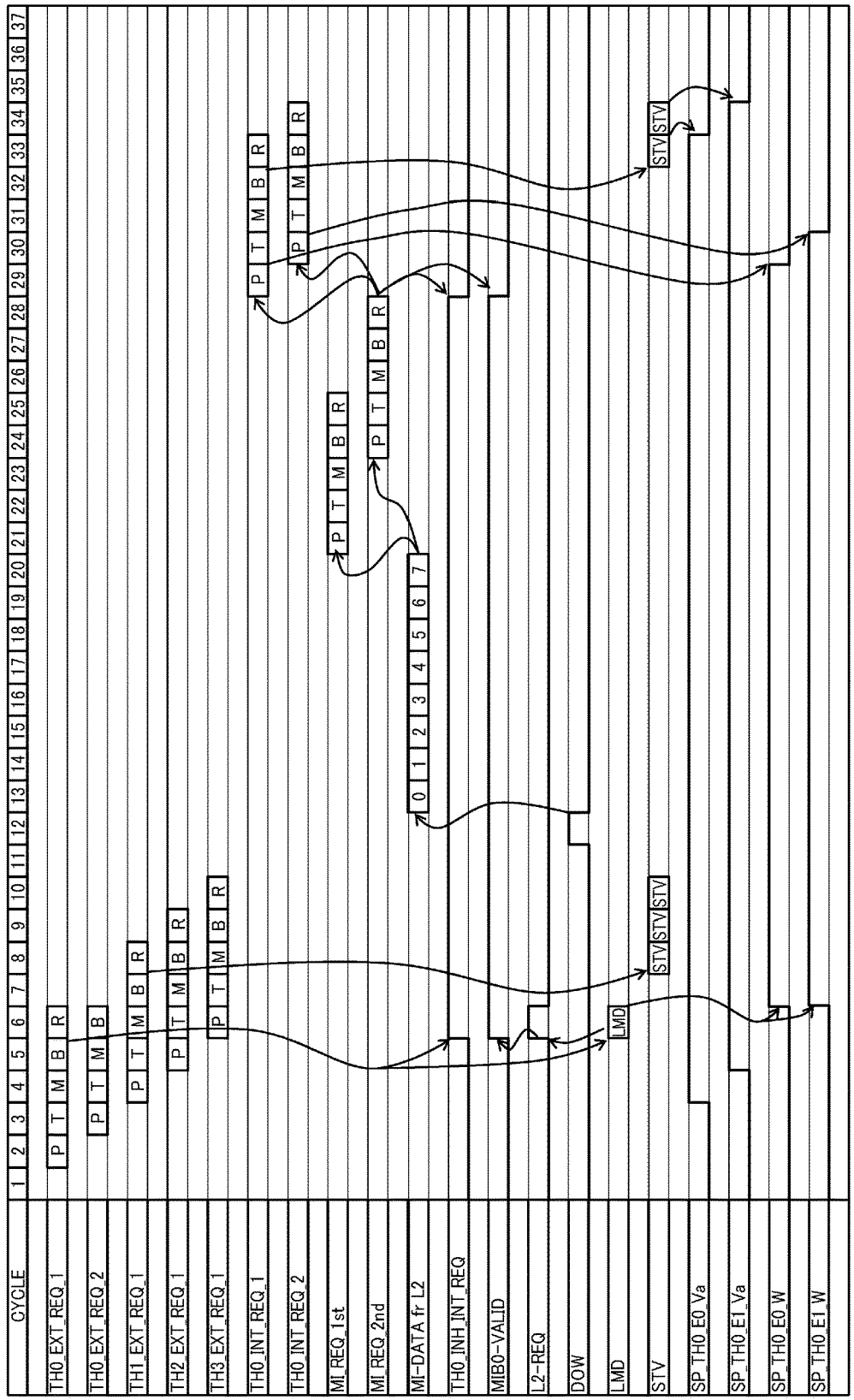
FIG. 8 is a timing chart illustrating an operation example of the instruction cache 131 in the first embodiment.

FIG. 8 is a timing chart illustrating an operation example of the instruction cache 131 in the first embodiment. In the operation example, the thread TH0 inputs two instruction fetch requests to the cache processing circuit 20 via the external request input EXT_REQ. A first one of the instruction fetch requests causes a cache error, and the two instruction fetch requests are aborted. Then, after a fetch request is output to the L2 cache and instruction data is returned at a prescribed clock cycle, the two aborted instruction fetch requests are sequentially input to the cache processing circuit 20 again via the internal request input INT_REQ. In addition, in succession to the two instruction fetch requests of the thread TH0, the instruction fetch requests of the threads TH1, TH2, and TH3 are input to the cache processing circuit 20 via the external request input EXT_REQ and then normally processed.

Respective signals in FIG. 8 are as follows.

CYCLE: Clock cycle number

TH#_EXT_REQ: Instruction fetch request of the thread TH# directly input from the instruction control unit IC to the cache processing circuit TH#_INT_REQ: Instruction fetch request of the thread TH# input from the request port 26 to the cache processing circuit MI_REQ: Request for writing instruction data from the L2 cache into the data memory D_RAM and the tag memory T_RAM of the L1 cache. Writing requests for writing the data into the two memories are generated.

MI-DATA fr L2: Cycle at which data is transferred from the L2 cache. Data is transferred at 8 cycles in this example.

TH0_INH_INT_REQ: Flag for forbidding the instruction fetch request TH0_INT_REQ to be input to the pipeline. In the example, the input of the instruction fetch request TH0_INT_REQ is forbidden until data from the L2 cache is moved (written) in the L1 cache.

MIB0-VALID: Circuit resource such as a buffer that is needed to move data in the L1 cache, which is secured by the move-in buffer MIB when the L2 cache is requested to output data (L2-REQ).

L2-REQ: Data request signal from the L1 cache to the L2 cache

DOW: Data response signal from the L2 cache. After this signal becomes "1," data is transferred from the L2 cache to the L1 cache at 8 cycles.

LMD: Line miss detect signal essentially representing that a data response is not allowed due to a cache error. However, the signal becomes "1" when all abort factors are generated, and an abort is caused in the present example.

STV: Status valid signal indicating that the L1 cache normally returns data to the instruction control unit SP_TH0_E0_Va: Valid bit of the entry E0 of the secondary port SP of the thread TH0

SP_TH0_E1_Va: Valid bit of the entry E1 of the secondary port SP of the thread TH0

SP_TH0_E0_W: Wait bit of the entry E0 of the secondary port SP of the thread TH0

SP_TH0_E1_W: Wait bit of the entry E1 of the secondary port SP of the thread TH0

Next, a description will be given of the operation of the instruction cache 131 of FIG. 8 with reference to the configuration of the instruction cache 131 of FIG. 2. First, in cycles 2 and 3, the two instruction fetch requests TH0_EXT_REQ_1 and TH0_ EXT_REQ_2 of the thread TH0 are sequentially input from the instruction control unit IC via the external request input EXT_REQ and then applied to the pipeline processing of the cache processing circuit 20. The entered two instruction fetch requests are accepted by the request port 26, and the valid bits Va of the two instruction fetch requests are put into the valid state "1" inside the secondary port.

However, in cycle 6, the cycle R processing unit 25 sets an LMD signal at "1", which represents that the first instruction fetch request TH0_EXT_REQ_1 has caused a cache error or the like. In response to this, the move-in buffer MIB outputs the data request L2-REQ to the L2 cache to secure a circuit resource for moving data in the primary cache (MIB0-VALID=1). In addition, in response to the result that the LMD signal is set at "1," the input request forbidding flag TH0_INH_INT_REQ for forbidding the input request signals R0 of the instruction fetch requests of the thread TH0 to be put into the input requesting state "1" is put into the forbidding state "1." Thus, the generation circuit 30_TH0 of FIG. 6 forcibly sets the input request signal R0 at "0," whereby the thread TH0 is put into a state in which the input request of the instruction fetch request is not made.

In addition, in cycle 6, since the LMD signal is set at "1" for the first instruction fetch request TH0_EXT_REQ_1, the next instruction fetch request TH0_EXT_REQ_2 is also aborted at cycle B. As a result, both the wait bits W of the secondary port for the two instruction fetch requests are put into the waiting state "1." Thus, the aborted instruction fetch requests are put into the waiting state and needed to be input again.

Next, in cycles 8, 9, and 10, the cycle R processing unit 25 generates the STV signals indicating that the following three instruction fetch requests TH1_EXT_REQ1—TH3_EXT_REQ1 have been normally finished.

In cycle 12, the latency of 6 cycles elapses from the cycle 6 in which the data request L2-REQ has been output to the L2 cache, the L2 cache returns the data response signal DOW, and instruction data fetched at 8 cycles from cycle 13 to cycle 20 is transferred from the L2 cache to the move-in buffer MIB of the L1 cache.

When the transfer of the instruction data is finished, the move-in input MI inputs a cache registration request (cache writing request) for registering the instruction data in the data memory D_RAM and the tag memory T_RAM to the cache processing circuit 20 at each of cycles 21 and 24.

When the cache registration of the instruction data is finished in cycle 28, the input request forbidding flag TH0_INH_INT_REQ is put into the allowing state "0" according to the result signal RES and the resource MIB0-VALID of the move-in buffer is also put into a data non-requesting state "0." As a result, the input request signal R0 of the thread TH0 is put into the requesting state "1," and the request determination circuit 27 sequentially inputs again the two instruction fetch requests TH0_INT_REQ_1 and TH0_INT_REQ_2 waiting inside the request port 26 to the cache processing circuit 20 via the internal request input INT_REQ. Since the two instruction fetch requests TH0_INT_REQ_1 and TH0_INT_REQ_2 are input again, the wait bits SP_TH0_E0_W and SP_TH0_E1_W of the two instruction fetch requests are put into the non-waiting state "0." The change of the wait bits is made by a control circuit (not illustrated in FIG. 2) inside the request port 26 in response to the result signal RES or the like.

Finally, in cycles 33 and 34, the STV signals are output as the two instruction fetch requests input again are normally finished, and the valid bits Va inside the secondary port are put into the invalid state "0" correspondingly. The change of the valid bits is made by the above control circuit (not illustrated in FIG. 2) inside the request port 26 in response to the STV signals.

From the timing chart of the operation example of FIG. 8, the outline of the operation of the request port 26 of the instruction cache 131 in the first embodiment may be understood. In the operation example of FIG. 8, only the instruction fetch requests of the thread TH0 are aborted and then input to the cache processing circuit again. However, FIG. 8 does not include an operation in which the instruction fetch requests of a plurality of threads are aborted and one of the threads is selected to input its instruction fetch request again.

When the instruction fetch requests of a plurality of threads are aborted and put into the waiting state as described above, the L1 cache outputs the data request L2-REQ for each of the instruction fetch requests to the L2 cache to acquire instruction data in the same manner as the above and then registers the instruction data in the cache. After that, the next thread determination circuit 31 (FIG. 6) of the request determination circuit 27 inside the request port 26 selects one of the plurality of threads and inputs the instruction fetch request in the waiting state of the selected thread in the cache processing circuit 20 again.

A specific example of the next thread determination circuit 31 will be described in the following second and third embodiments.

Second Embodiment

In the second embodiment, the next thread determination circuit 31 selects a thread to be input according to the order of an LRU method from among the instruction fetch requests in a waiting state of a plurality of threads. Therefore, the next thread determination circuit 31 input information on the chronological order of the four threads TH# of an LRU queue in addition to the input request signals R0 to R3 of the respective threads, and determines, as a next thread, the oldest one of the threads in which the input request signals R0 to R3 are put into the requesting state "1."

Figure 9:
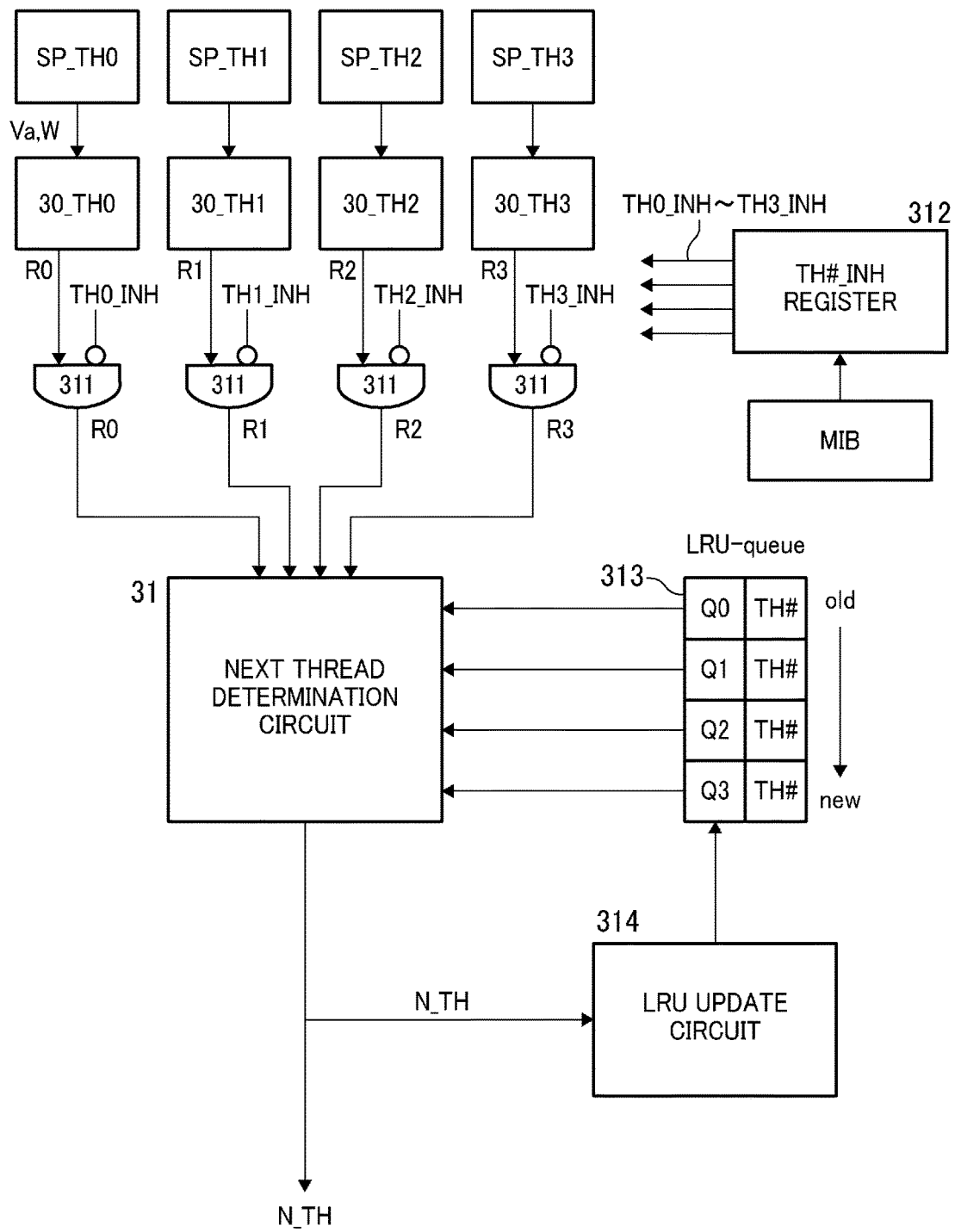
FIG. 9 is a diagram illustrating the configuration of the next thread determination circuit 31 in the second embodiment.

FIG. 9 is a diagram illustrating the configuration of the next thread determination circuit 31 in the second embodiment. As illustrated in FIG. 6, the next thread determination circuit 31 of FIG. 9 input the input request signals R# generated by the generation circuits 30_TH# based on the valid bits Va and the wait bits W of the secondary ports SP_TH# of the respective threads.

In FIG. 9, however, the next thread determination circuit 31 input the input request signals R# generated by the generation circuits 30_TH# via AND gates 311. Then, the four AND gates 311 input the input request forbidding flags TH#_INH in their inverted state. The four AND gates 311 forcibly put the input request signals R# into the non-input requesting state "0" when the input request forbidding flags TH#_INH are put into in the forbidding state "1", and output the input request signals R# as they are when the input request forbidding flags TH#_INH are put into the allowing state "0." Then, until a request for registering acquired instruction data in the cache is finished since the start of requesting the L2 cache to output the data, the move-in buffer MIB puts the flags of an input request forbidding flag TH#_INH register 312 into the forbidding state "1" to forbid the input request signals R# of the threads to be put into the requesting state "1."

In FIG. 9, an LRU queue 313 and an LRU update circuit 314 are provided. The LRU queue 313 stores the thread numbers TH# in four entries Q0 to Q4 in chronological order. Then, the LRU update circuit 314 updates the order of the thread numbers TH# inside the LRU queue 313 in response to the next thread N_TH output from the next thread determination circuit 31.

The specific update operation of the LRU update circuit 314 is as follows. It is assumed that TH0, TH1, TH2, and TH3 are, for example, registered in the four entries Q0 to Q4 of the LRU queue 313 as initial numbers. In this initial state, the thread TH0 is the oldest thread, and the threads TH1, TH2, and TH3 become newer in this order. Then, the next thread determination circuit 31 selects the oldest thread in the LRU queue as the next thread N_TH that is to be input, from among the threads in which the input request signals R# are put into the requesting state "1,". For example, when the next thread determination circuit 31 selects the thread TH0 as the next thread N_TH, the LRU update circuit 314 moves the thread TH0 from the oldest entry Q0 to the newest entry Q3 inside the LRU queue 313 and moves the thread numbers TH# inside the entries Q1, Q2, and Q3 to the entries Q0, Q1, and Q2, respectively. As a result, the four threads TH1, TH2, TH3, and TH0 become older in this order.

After that, when the next thread determination circuit 31 selects the thread TH2 as the next thread N_TH, the LRU update circuit 314 moves the thread TH2 inside the entry Q1 to the entry Q3 and moves the threads TH3 and TH0 inside the entries Q2 and Q3 to the entries Q1 and Q2, respectively. As a result, the four threads TH1, TH3, TH0, and TH2 become older in this order.

As described above, the LRU update circuit 314 updates the order of the threads inside the LRU queue 313 every time the next thread determination circuit 31 outputs the next thread N_TH and stores the thread numbers in the entries Q0 to Q3 of the LRU queue 313 in chronological order at that time.

Figure 10:
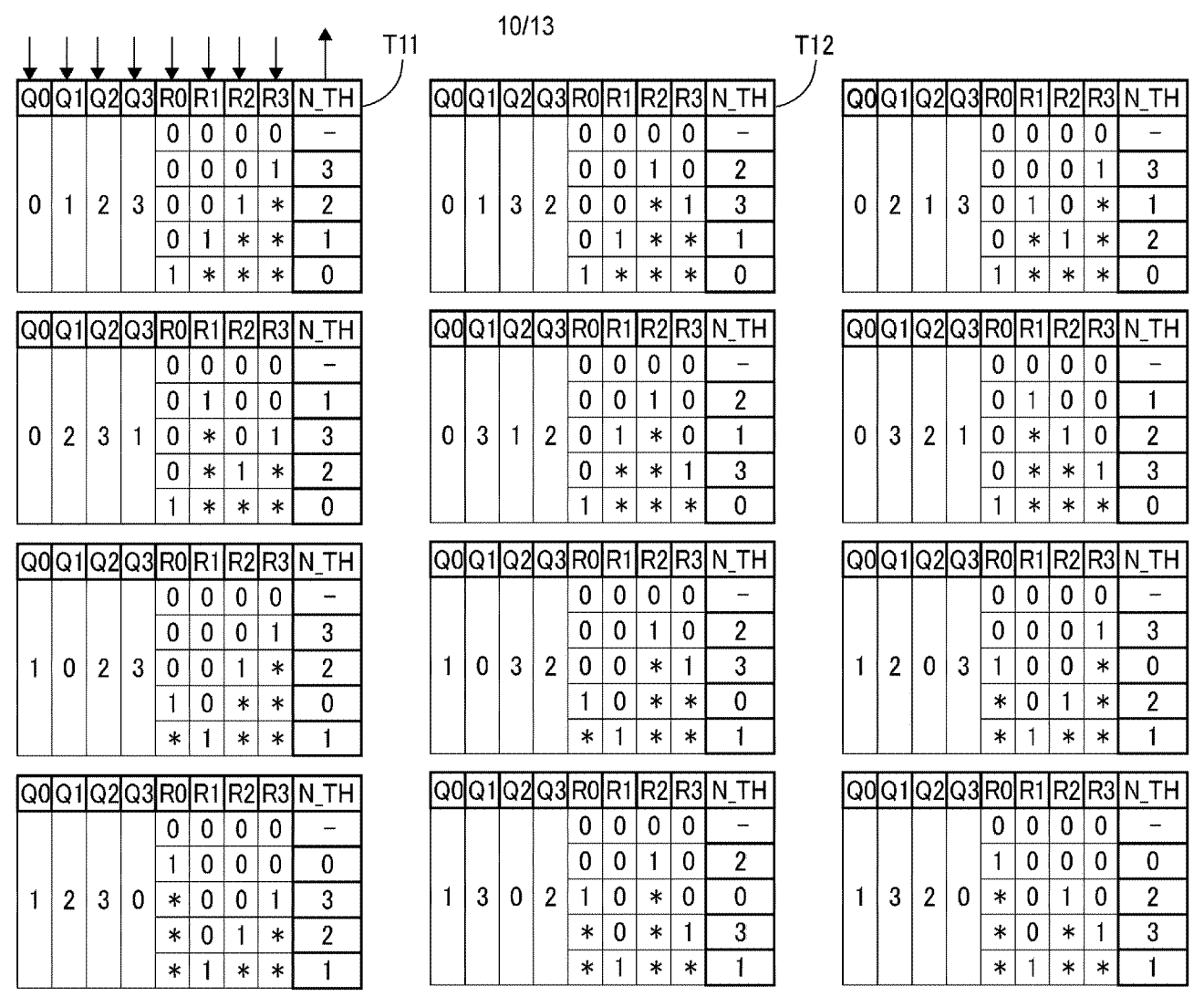
Figure 11:
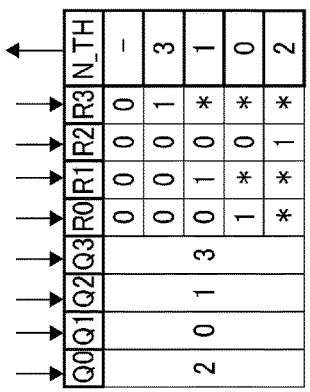
FIG. 11 is a diagram exemplifying the truth tables of the next thread determination circuit 31 in the second embodiment.

FIGS. 10 and 11 are diagrams exemplifying the truth tables of the next thread determination circuit 31 in the second embodiment. 24 truth tables are provided corresponding to the number of the combinations of the orders of the LRU queue. For example, a description will be given of the operation of the logical operation circuit of the next thread determination circuit with reference to a truth table T11 on the upper left side of FIG. 10.

The logical operation circuit based on the truth table T11 on the upper left side of FIG. 10 input the respective entries Q0 to Q3 of the LRU queue and the input request signals R0 to R3 and outputs the next thread N_TH. That is, according to the LRU queue, the four threads TH0, TH1, TH2, and TH3 become older in this order according to the order of the entries Q0, Q1, Q2, and Q3. Accordingly, when the input request signal R0 of the oldest thread TH0 is set at "1," the "thread 0" is the next thread N_TH regardless of the states of the input request signals R1 to R3 of the other threads.

Similarly, when the input request signal R3 of the newest thread TH3 is set at "1," the "thread TH3" is the next thread N_TH provided that all the input request signals R0 to R2 of the other threads are set at "0." When the input request signals R1 and R2 of the threads TH1 and TH2 are set at "1," the "thread TH1" or the "thread TH2" are the next thread N_TH provided that all the input request signals of the threads older than the thread TH1 or the thread TH2 are set at "0". That is, the above operation is similar to the operation of calculating the TH#_X of the truth table T2 of FIG. 7.

In the case of the next thread determination circuit 31 of FIG. 9, however, the order of the LRU queue 313 dynamically changes. Therefore, the truth tables corresponding to the number of the combinations of the orders of the 24 types of threads possibly taken by the LRU queue are needed. It is understood that all the truth tables are made the same as the truth table T11 on the upper left side when the arrangement of the input request signals R0 to R3 are changed according to the combinations of the entries Q0 to Q3 of the LRU queue.

For example, in the case of a truth table T12, the threads TH0, TH1, TH3, and TH2 are stored in the entries Q0 to Q3, respectively. Therefore, when the input request signals are rearranged in the order of R0, R1, R3, and R2, the truth table T12 is made the same as the truth table T11. That is, when the input request signal R0 of the oldest thread TH0 is set at "1," the thread TH0 becomes the next thread N_TH regardless of the input request signals R1 to R3 of the other threads as is the case with the truth table T11. In addition, when the input request signal R2 of the newest thread TH2 is set at "1," the thread TH2 becomes the next thread N_TH provided that all the input request signals R0, R1, and R3 of the other threads TH0, TH1, and TH3 are set at "0."

The same applies to the other truth tables.

Third Embodiment

In the third embodiment, the next thread determination circuit 31 selects a thread to be input according to the order of a round robin method from among the instruction fetch requests in a waiting state of a plurality of threads. However, a thread (current thread) most recently selected to be input is set as the newest thread, and threads from the newest thread to the oldest thread are determined in a circulating order. Therefore, the next thread determination circuit 31 input information on a current thread C_TH in addition to the input request signals R0 to R3 of respective threads and determines the order of the threads from the oldest one to the newest one based on the current thread C_TH. Then, the next thread determination circuit 31 determines, as a next thread, the oldest thread in chronological order among the threads in which the input request signals R0 to R3 are put into the requesting state "1."

Figure 12:
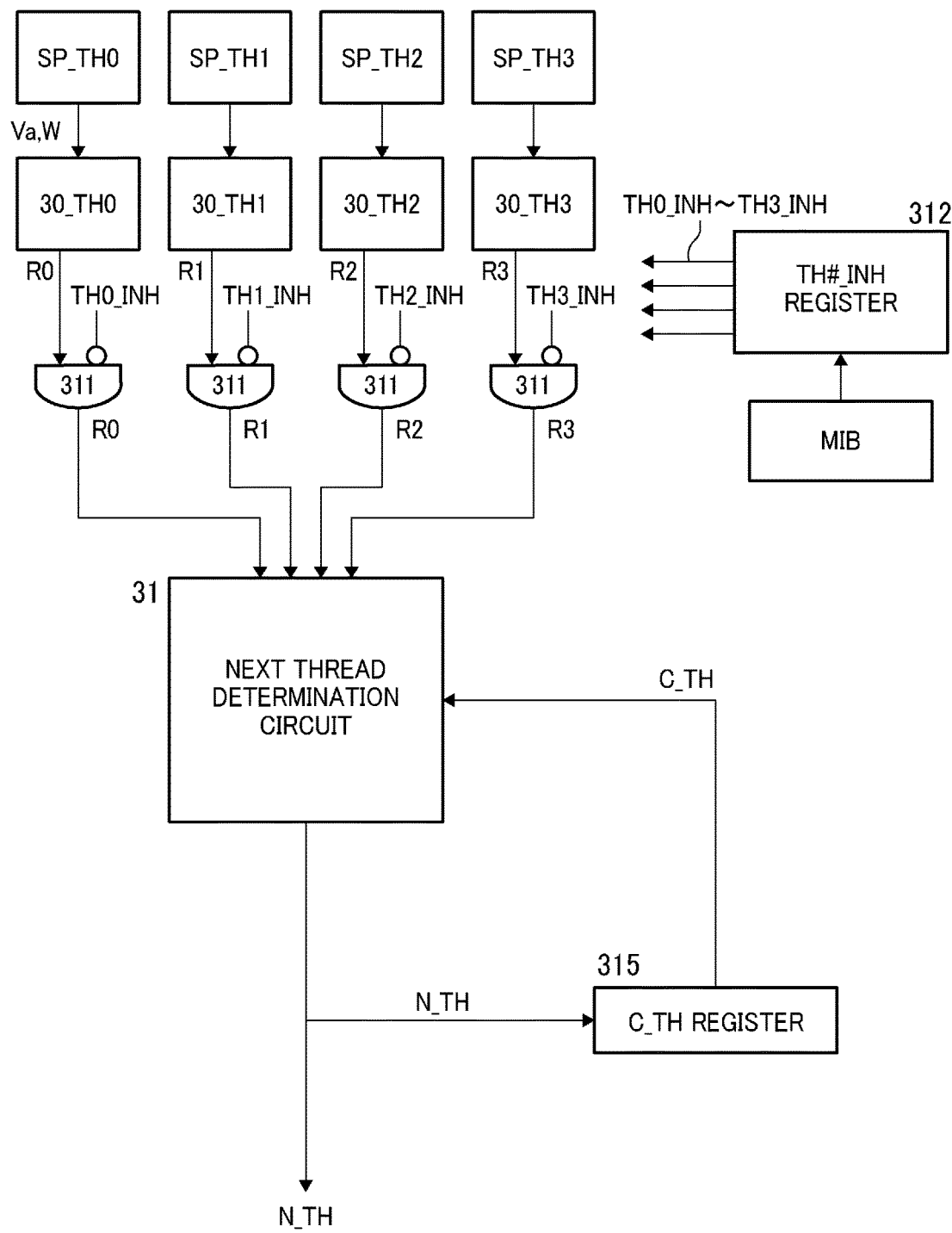
FIG. 12 is a diagram illustrating the configuration of the next thread determination circuit 31 in the third embodiment.

FIG. 12 is a diagram illustrating the configuration of the next thread determination circuit 31 in the third embodiment. The configuration of FIG. 12 differs from the configuration of FIG. 9 in that it has a current thread register 315 used to store the next thread N_TH output from the next thread determination circuit 31 and that the next thread determination circuit 31 determines the order between threads based on the current thread C_TH. Other than this point, the configuration of FIG. 12 is the same as the configuration of FIG. 9.

Figure 13:
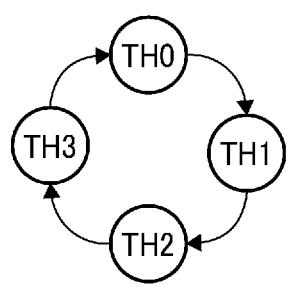
FIG. 13 is a diagram exemplifying the truth tables of the next thread determination circuit 31 in the third embodiment.

FIG. 13 is a diagram exemplifying the truth tables of the next thread determination circuit 31 in the third embodiment. On the left side of FIG. 13, the fixed circulating order between the threads TH0 to TH3 according to a round robin method is illustrated. In the circulating order, the four threads TH0, TH1, TH2, and TH3 are fixed in an order in which they are arranged in a ring shape. Then, when the thread TH2 is a current thread that is most recently input, the order of the threads from the oldest one to the newest one is the order of the threads TH3, TH0, TH1, and TH2. Similarly, when the thread TH0 is a current thread, the order of the threads from the oldest one to the newest one is the order of the threads TH1, TH2, TH3, and TH0. Accordingly, the third embodiment provides the four orders of the threads and four truth tables substantially smaller in number than the 24 truth tables of the second embodiment.

A description will be given of the operation of the logical operation circuit of the next thread determination circuit 31 with reference to the truth table of FIG. 13. Four truth tables are provided corresponding to the numbers 0 to 3 of the current thread C. Then, the truth tables input the current threads C and the input request signals R0 to R3 of the respective threads and output the next thread numbers N_TH.

For example, when the current thread C is set at "3," a bottom table T23 becomes the truth table. Since the current thread C is set at "3" in the truth table T23, the order of the threads from the oldest one to the newest one is the order of the threads TH0, TH1, TH2, and TH3. Accordingly, the truth table T23 is made the same as the truth table T11 of FIG. 10. That is, when the input request signal R0 of the oldest thread TH0 is set at "1," the "thread TH0" is the next thread N_TH regardless of the states of the input request signals R1 to R3 of the other threads. Similarly, when the input request signal R3 of the newest thread TH3 is set at "1," the "thread TH3" is the next thread N_TH provided that all the input request signals R0 to R2 of the other threads are set at "0." When the input request signals R1 and R2 of the threads TH1 and TH2 are set at "1," the "thread TH1" or the "thread TH2" are the next thread provided that all the input request signals older than the thread TH1 or the thread TH2 are set at "0." That is, the above operation is similar to the operation of calculating the TH#_X of the truth table T2 of FIG. 7.

Similarly, in a truth table T22 where the current thread C is set at "2, the order of the threads from the oldest one to the newest one is the order of the threads TH3, TH0, TH1, and TH2. Accordingly, when the input request signal R3 of the oldest thread TH3 is set at "1," the "thread TH3" becomes the next thread N_TH regardless of the states of the input request signals of the other threads. Conversely, when the input request signal R2 of the newest thread TH2 is set at "1," the "thread TH2" becomes the next thread N_TH provided that all the input request signals of the other threads are set at "0."The same applies to the other truth tables T20 and T21.

According to the third embodiment, since the next thread determination circuit 31 has only the four truth tables, the logical circuit of the next thread determination circuit 31 may be reduced in size compared with the second embodiment.

As described above, the embodiment provides the multi-thread compatible processor in which the request port that accepts instruction fetch requests has the primary port provided in common to multiple threads and storing information (e.g., addresses) on the instruction fetch requests and has the plurality of secondary ports provided corresponding to the threads, respectively, and storing the indexes and the wait flags of the instruction fetch requests stored in the primary port. Then, the request port selects one of the instruction fetch requests to be next input in the chronological order inside the threads or in the prescribed order between the threads. Accordingly, the request port having a small circuit size may control the instruction fetches of the multiple threads.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing device comprising:
   an instruction control unit that outputs an instruction fetch request;
   a primary cache that has,
      a request port that enters the instruction fetch request output from the instruction control unit,
      an instruction cache memory that stores an instruction data, and
      a cache processing unit that outputs instruction data corresponding to the instruction fetch request in response to an input of the instruction fetch request from the request port; and
   a secondary cache that returns the instruction data to the primary cache in response to a data request output from the primary cache when a cache error is caused in the primary cache,
   the request port has
   a primary port that is provided in common to a plurality of threads and has a plurality of entries each of which stores information on the instruction fetch requests of each of the plurality of threads,
   a plurality of secondary ports that are provided corresponding to the plurality of threads, respectively, and each of which stores entry numbers of the plurality of entries in the primary port,
   the primary port has entries fewer in number than a total number of the entries of the plurality of secondary ports, and
   a request determination unit that
      selects an instruction fetch request waiting for being input to the primary cache, respectively from among the instruction fetch requests that are stored in each of the plurality of secondary ports, in an order in which the instruction fetch requests are output from the instruction control unit, and
      determines an instruction fetch request to be input to the primary cache, from among the instruction fetch requests that are selected from the plurality of secondary ports respectively, in a predetermined order of the plurality of threads.

2. The arithmetic processing device according to claim 1, wherein
   each of the plurality of entries in each of the plurality of secondary ports stores a wait bit, which represents whether an instruction fetch request is waiting for being input to the primary cache, together with a corresponding one of entry numbers of the primary port,
   the primary cache aborts a first instruction fetch request causing a cache error and a second instruction fetch request of a same thread input after the first instruction fetch request and puts the wait bits of the aborted first and second instruction fetch requests inside the secondary port into a waiting state, and
   the request determination unit selects oldest entries, in which the wait bits are put into the waiting state, respectively from among the plurality of entries of the respective secondary ports.

3. The arithmetic processing device according to claim 2, wherein, when an instruction fetch request in the waiting state is input to the cache processing unit, the primary cache changes the wait bit of the input instruction fetch request into a non-waiting state.

4. The arithmetic processing device according to claim 2, wherein the primary cache
   puts a forbidding flag, by which the request determination unit is controlled so as not to select a first instruction fetch request, into a forbidding state during a period in which the secondary cache is requested to output instruction data of the first instruction fetch request causing the cache error, and
   changes the forbidding flag into an allowing state when receiving the instruction data of the first instruction fetch request from the secondary cache.

5. The arithmetic processing device according to claim 2, wherein the prescribed order is an order in which the instruction fetch request is input to the primary cache.

6. The arithmetic processing device according to claim 5, wherein the request determination unit selects an oldest thread in an order of inputting the plurality of threads, as the entry of the instruction fetch request to be input to the primary cache, from among the entries selected by the plurality of secondary ports.

7. The arithmetic processing device according to claim 2, wherein the prescribed order is an order in which a thread next to a most recently input thread becomes oldest in a fixed circulating order of the plurality of threads.

8. The arithmetic processing device according to claim 7, wherein the request determination circuit selects an oldest thread in the prescribed order, as the entry of the instruction fetch request to be input to the primary cache, from among the entries selected by the plurality of secondary ports.

9. The arithmetic processing device according to claim 2, wherein, when returning the instruction data corresponding to the input instruction fetch request to the instruction control unit, the primary cache changes the entry inside the secondary port of the input instruction fetch request into an invalid state.

10. The arithmetic processing device according to claim 1, wherein
    the primary cache has a pipeline configuration with a plurality of stages in which the input instruction fetch request is processed, and
    each of the plurality of secondary ports has entries greater in number than the stages of a pipeline of the primary cache.

11. A method of controlling an arithmetic processing device which includes an instruction control unit that outputs an instruction fetch request; a primary cache that has a request port that enters the instruction fetch request output from the instruction control unit, an instruction cache memory that stores an instruction data, and a cache processing unit that outputs instruction data corresponding to the instruction fetch request in response to an input of the instruction fetch request from the request port; and a secondary cache that returns the instruction data to the primary cache in response to a data request output from the primary cache when a cache error is caused in the primary cache, wherein the request port has a primary port that is provided in common to a plurality of threads and has a plurality of entries each of which stores information on the instruction fetch requests of each of the plurality of threads, and a plurality of secondary ports that are provided corresponding to the plurality of threads, respectively, and each of which stores entry numbers of the plurality of entries in the primary port, the primary port has entries fewer in number than a total number of the entries of the plurality of secondary ports, the method comprising:

selecting, by the request port, an instruction fetch request waiting for being input to the primary cache, respectively from among the instruction fetch requests that are stored in each of the plurality of secondary ports, in an order in which the instruction fetch requests are output from the instruction control unit, and determining, by the request port, an instruction fetch request to be input to the primary cache, from among the instruction fetch requests that are selected from the plurality of secondary ports respectively, in a predetermined order of the plurality of threads.

12. The method of controlling the arithmetic processing device according to claim 11, wherein each of the plurality of entries in each of the plurality of secondary ports stores a wait bit, which represents whether an instruction fetch request is waiting for being input to the primary cache, together with a corresponding one of entry numbers of the primary port, the method further comprising:

aborting, by the primary cache, a first instruction fetch request causing a cache error and a second instruction fetch request of a same thread input after the first instruction fetch request and puts the wait bits of the aborted first and second instruction fetch requests inside the secondary port into a waiting state, and selecting, by the request port, oldest entries, in which the wait bits are put into the waiting state, respectively from among the plurality of entries of the respective secondary ports.

13. The method of controlling the arithmetic processing device according to claim 12, further comprising:

changing, by the primary cache, the wait bit of the input instruction fetch request into a non-waiting state, when an instruction fetch request in the waiting state is input to the cache processing unit.

\* \* \* \* \*